(12) United States Patent
Dollmeier et al.

(10) Patent No.: US 6,610,244 B2
(45) Date of Patent: Aug. 26, 2003

(54) METHOD FOR CONNECTING SINTERED BODY TO A METALLIC SUPPORT ELEMENT

(75) Inventors: Klaus Dollmeier, Schwelm (DE); Jens Wahnschaffe, Köln (DE)

(73) Assignee: GKN Sinter Metals GmbH (DE)

( * ) Notice: Subject to any disclaimer, the term of this patent is extended or adjusted under 35 U.S.C. 154(b) by 0 days.

(21) Appl. No.: 09/899,893

(22) Filed: Jul. 6, 2001

(65) Prior Publication Data

US 2002/0085942 A1 Jul. 4, 2002

Related U.S. Application Data

(63) Continuation of application No. PCT/EP00/00040, filed on Jan. 5, 2000.

(30) Foreign Application Priority Data

Jan. 8, 1999 (DE) .......................................... 199 00 388

(51) Int. Cl.[7] .................................................. B22F 7/04
(52) U.S. Cl. ................................................ 419/8; 419/5
(58) Field of Search .......................................... 419/8, 5

(56) References Cited

U.S. PATENT DOCUMENTS

| | | | | |
|---|---|---|---|---|
| 3,889,349 A | * | 6/1975 | Kaufman | 228/173 |
| 4,226,917 A | * | 10/1980 | Tsuruoka et al. | 428/614 |
| 4,409,079 A | * | 10/1983 | Miyazaki et al. | 204/192 C |
| 4,456,578 A | | 6/1984 | Ward | 419/8 |
| 4,505,987 A | * | 3/1985 | Yamada et al. | 428/553 |
| 4,598,025 A | * | 7/1986 | Mizuhara | 428/450 |
| 5,891,206 A | * | 4/1999 | Ellingson | 1/309 |
| 5,988,488 A | * | 11/1999 | Slattery et al. | 228/262.6 |
| 6,089,444 A | * | 7/2000 | Slatery et al. | 228/194 |

FOREIGN PATENT DOCUMENTS

| | | |
|---|---|---|
| GB | 1 345 847 | 2/1974 |
| WO | WO 95/27153 | 10/1995 |

* cited by examiner

*Primary Examiner*—Daniel J. Jenkins
(74) *Attorney, Agent, or Firm*—Woodcock Washburn LLP

(57) ABSTRACT

The invention relates to a method for connecting a metallic support element to at least one body consisting of a powder metallurgical sintered material. The method is characterised in that said body is brought into contact with the support element in the form of a green body which is compacted from a sintered powder, in that a thin, flat copper body is brought into contact with the green body respectively and in that the entire resulting arrangement is heated to the temperature required to sinter the green body before being cooled again once the sintering process is complete.

15 Claims, 2 Drawing Sheets

METHOD FOR CONNECTING SINTERED BODY TO A METALLIC SUPPORT ELEMENT

Figure 1:
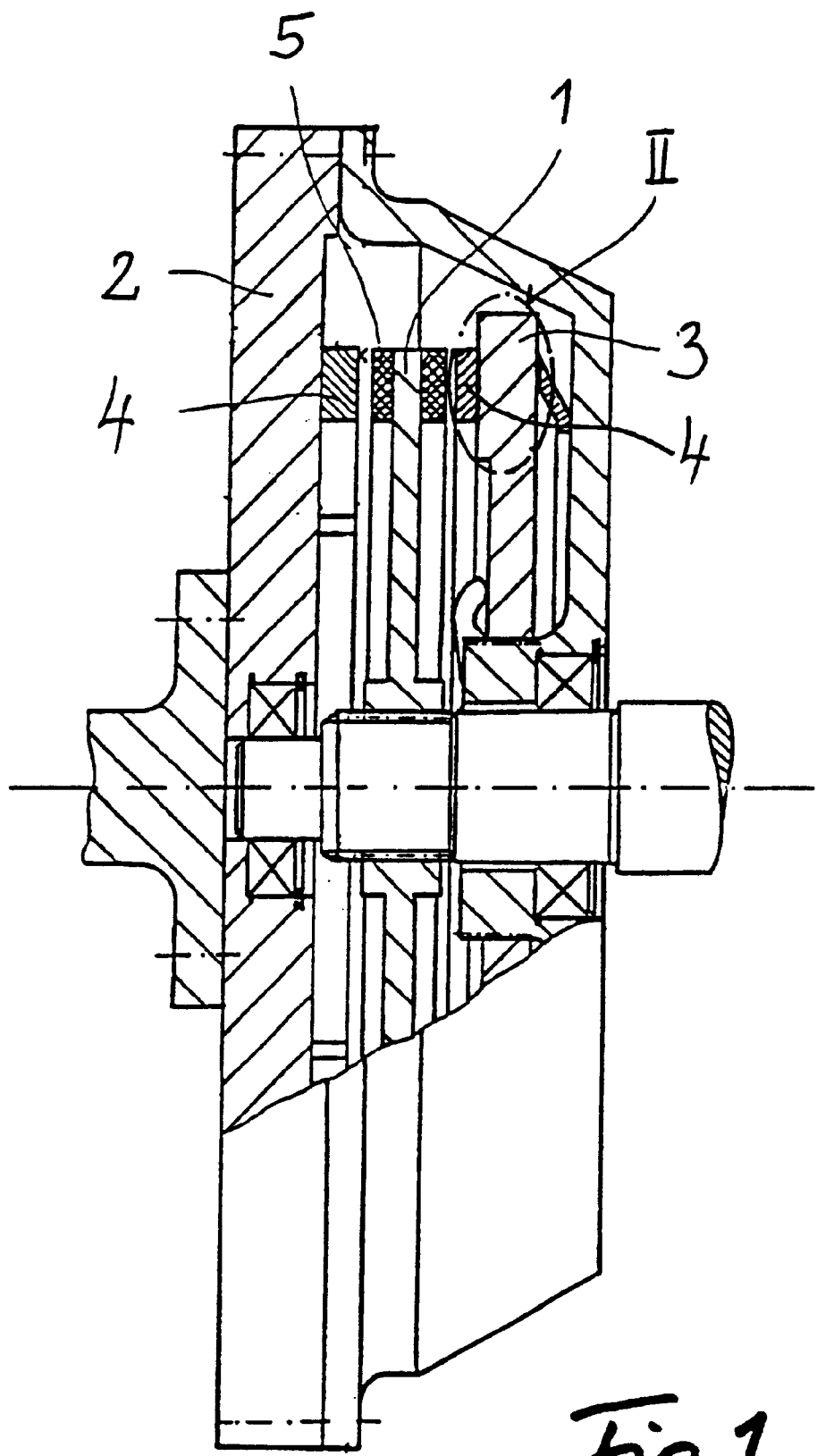

This application is a continuation of PCT/EP00/00040 filed Jan. 5, 2000.

DESCRIPTION

WO 95/27153 describes a known manual clutch, in particular a manual clutch for motor vehicles, that has, in addition to a clutch disc layered with an organic friction lining, a counter rotor and a pressure plate, each of which is layered with a friction lining made up of a powder-metallurgically sintered material. The powder-metallurgically sintered material consists essentially of an iron material that is displaced by an amount of hard particles as friction enhancers and which has in addition a fraction of 10 to 15-weight % copper. A frictional material produced from a powder-metallurgically sintered material has a certain porosity that has a favorable effect on the frictional behavior of the manufactured clutch. Furthermore, it has been shown that the porosity existent on the essentially metallic frictional surface does not deteriorate so easily as the organic friction lining wears down. In addition to being able to removably attach the manufactured sintered members, the possibility is also provided in this known clutch for sintering to occur directly onto the counter rotor or the pressure plate, called support elements below, as a friction-lining layer. By sintering a friction-lining layer directly onto a metallic support element, the strength of the connection attained is more than enough at increased load requirements. For the application of a clutch described previously, the attainable strength is insufficient to transfer torque.

GB 1345847 discloses a process to manufacture friction members in which in general a powdered sinter material is sintered with a powdered layer of copper on a support element.

The object of this invention is to create a process that enables the connection of a powder-metallurgically sintered member solidly to a metallic support element.

In an especially advantageous configuration of the invention, it is provided that, for the green body, a basically copper-free sintered powder is provided. Here it is appropriate if the green body is basically composed of a mixture of an iron powder and powder-like additives. A green body composed in this manner and a sintered body formed from it following sintering present the advantage that the sintered powder can be composed in relation to standards with regard to strength and additional standards for attaining special properties with a view toward the intended use, whereby the iron powder can also be an alloyed iron powder. Thus, for example, it is possible for sintered friction elements to add "stop substances" as friction supports through appropriate hard material, as, for example, metal carbides or the like. In practice, it has surprisingly turned out that a friction element made of a copper-free sintered element (which has been joined according to the invention with the support element during the sintering process in the manner of a hard solder, for example for an element in shiftable clutches) has a clearly better friction behavior than the friction elements manufactured according to the traditional procedure of a copper-containing iron sinter powder. This, according to previous information, is to be attributed to the fact that the copper body applied to the green body on copper-free sintered powder melts even before starting the sintering process and largely flows through the pores of the green body, and in penetrating the pore structure merely wets the free surface of the already sintered matrix of the sintered friction element so that, other than with a green body with admixed copper components in the metal powder, a better accuracy in size exists.

It is further provided in configuring the invention that basically pure copper is used in the copper element. In an advantageous further configuration of the invention, it is provided that an alloyed copper is used for the copper body. Preferably such metals are used as alloy components which bring about a wetting of the surface of the matrix of the sintered body basically formed by iron. The copper body can be comprised by a sheet of suitable metal or by a stamping of copper powder. With the use of such a stamping, there exists the possibility of admixing with the copper powder still further powder components, for example, an iron powder and a manganese powder or an iron powder alloyed with manganese so that the wetting capacity of the melts arising from the copper body is improved in relation to the surface of the matrix of the sintered body.

In configuring the invention, it is provided that the thickness of the copper body comes to at least 10% of the thickness of the green body. In configuring the invention, it is also provided that the copper content of the copper body comes to at least 20% by weight in relation to the weight of the green body. In proportioning the amount of copper, the porosity of the sintered body must also be taken into consideration, since sintered bodies with a larger pore volume hold part of the amount of copper in the pore structure, so that through a correspondingly greater amount of copper, the "through flow" up to the surface of the support element is guaranteed.

The invention will be explained below in greater detail on the basis of schematic drawings for the application of a clutch, wherein:

FIG. 1 Depicts a shiftable clutch, partially in section

Figure 2:
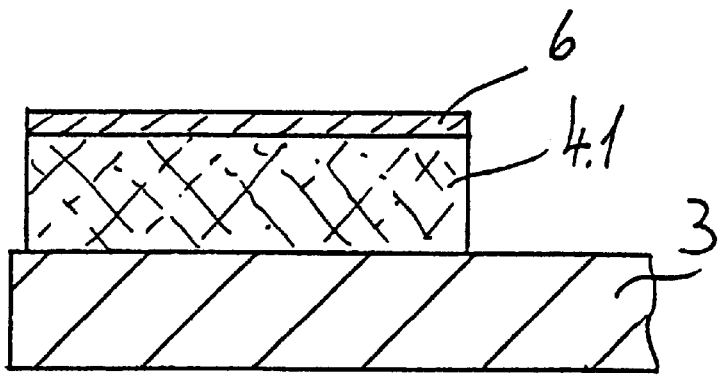
Figure 3:
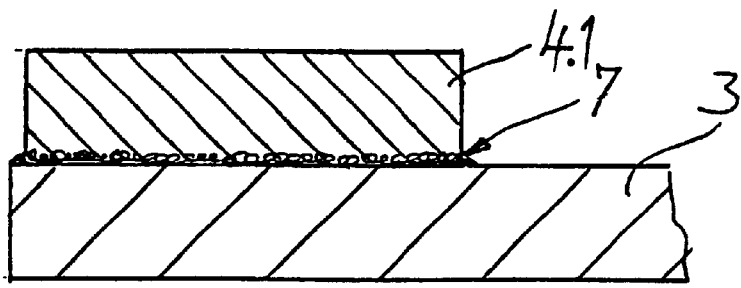
Figure 4:
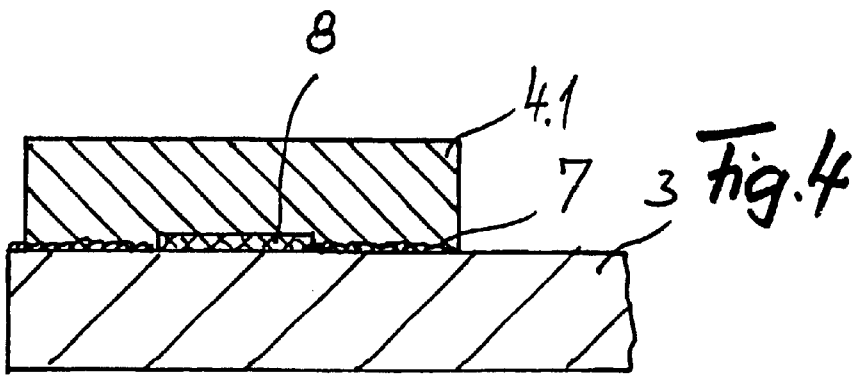

FIG. 2 Shows in larger scale a partial section corresponding to detail II in FIG. 1 through a support element with green body laid on prior to conducting the sintering process, FIG. 3 Illustrates in part section corresponding to FIG. 2 the support element with ready sintered sintered body, FIG. 4 Reveals in partial section corresponding to FIG. 3 an embodiment with a connection extending only over a partial area.

The clutch represented in the drawing has a clutch disk 1, a counter rotor 2 and a thrust plate 3. The construction and the arrangement of the individual structural units of the clutch basically corresponds to the structure of a typical single disk dry clutch and will therefore not be explained in greater detail below. In particular, the actuation resources for the thrust plate 3 are not represented in greater detail in the drawing.

Sintered bodies 4 are arranged on the counter rotor 2 and the thrust place 3, both hereinafter designated as support elements 3 which interact with the friction linings 5 arranged on both sides of the clutch disk 1, for example of organic friction material. The sintered bodies 4 can consist of several individual elements arranged on the support elements 3 in the peripheral direction or, however, also be formed by an individual annular friction element in each case.

The sintered bodies 4 consist of a powder metallurgical sintered material on the basis of iron, whereby preferably hard particles are sintered into the sintered body 4 as so-called friction supports.

As is apparent from FIGS. 2 and 3, for manufacturing as a metallic support element 3, a support disk which can consist of gray cast iron, for example of lamellar cast iron, is positioned in horizontal orientation, and subsequently the green body 4.1 pressed on the basis of a metallic sintered powder is loosely laid on for manufacturing the sintered bodies 4 which are here designed as friction bodies. The green bodies 4.1 are pressed on the basis of a practically copper-free iron powder mixed with hard particles. On the green body 4.1, a copper body 6 is subsequently laid, which at least partially covers the surface of the green body 4.1 and corresponds to the peripheral contour of the green body 4.1 in its peripheral structure. The copper body 6 can be punched out as a copper sheet of suitable copper or, however, also consist of copper powder through a correspondingly dimensioned stamping. Here it can be appropriate if no pure copper is used for the stamping, but rather if the copper is mixed with additives reducing the melting point. For example, it is appropriate if a certain portion of iron powder and manganese powder is contained in the stamping which (as will be explained in greater detail below) improves the wetting between the sintered body matrix and the copper. An addition of Fe with 2.4% by weight and of 1% by weight of manganese powder can be appropriate, in each case related to the weight of the copper portion.

The support element 3 thus outfitted is subsequently heated up in a sintering furnace to the sintering temperature and maintained at the sintering temperature until the green body 4.1 is fully sintered. With this temperature treatment, the green body is first sintered on, after this the copper body 6 lying on the green body 4.1 melts. In consequence of the porosity of the green body 4.1, the liquid copper penetrates the green body matrix already after the beginning of sintering and discharges with appropriate proportioning of the amount in the manner of solder in the contact area between the green body 4.1 and the support element 3. After finishing soldering and cooling of the support element, the completely sintered sintered body 4 is joined fast on the support element 3 by a corresponding connection layer 7 acting as a hard solder. In flowing through the pores, the free surfaces of the sintered on matrix are wetted with copper so that after cooling, the sintered body matrix is provided with a thin copper layer in its pore regions and the sintered body has practically no covering and has a good size stability.

The invention is not restricted to the previously described application of manufacturing a pressure plate and/or a counter rotor of a shiftable clutch. It is rather applicable for all uses in which one or more sintered bodies are to be fastened to a metallic support element, and high standards with respect to strength are also to be imposed upon the connection.

It is furthermore possible to create recesses or the like in partial contact areas between support element 3 and green body 4.1 through appropriate non-sintering solid intermediate layers 8 or through a zone-wise coating with a separator, for example, a boron nitride suspension or an aluminum oxide suspension, so that, instead of a full area connection, a connecting layer 7 arises which extends only over corresponding partial areas of the covering area, as this is indicated in FIG. 4.

What is claimed is:

1. A process for connecting a sintered body to a metallic support element comprising the steps of:
    (a) providing a support element made of solid metal;
    (b) providing at least one pressed green compact made of a sintered metallurgical powder;
    (c) contacting the green compact with the support element;
    (d) providing a thin, flat copper member;
    (e) bringing the copper member into contact with the green compact;
    (f) heating the support element, green compact, and copper member to a temperature and for a time sufficient to sinter the green compact; and
    (g) cooling the finished product.

2. The process of claim 1, wherein the green compact is an essentially copper-free sintered powder.

3. The process of claim 1, wherein the green compact is essentially a mixture of iron powder and powdered frictional enhancers.

4. The process of claim 1, wherein the copper member is made of essentially pure copper.

5. The process of claim 1, wherein the copper member is a copper alloy.

6. The process of claim 1, wherein the copper member is a copper sheet.

7. The process of claim 1, wherein the copper member is formed from pressed copper powders.

8. The process of claim 1, wherein the thickness of the copper member is at least 10% of the thickness of the green compact.

9. The process of claim 1, wherein the weight of the copper in the copper member is at least 20% of the weight of the green compact.

10. The process of claim 1, herein non-sintering layers are provided between the green compact element.

11. The process of claim 1, wherein the support member comprises iron.

12. A product manufactured by the process of claim 1, comprising a sintered member and a support element.

13. The product of claim 12, wherein the member is a friction member.

14. The product of claim 12, wherein the support element is a support disc.

15. The product of claim 12, wherein the support element is made of iron.

* * * * *

UNITED STATES PATENT AND TRADEMARK OFFICE
CERTIFICATE OF CORRECTION

PATENT NO. : 6,610,244 B2  Page 1 of 1
DATED : August 26, 2003
INVENTOR(S) : Klaus Dollmeier and Jens Wahnschaffe It is certified that error appears in the above-identified patent and that said Letters Patent is hereby corrected as shown below:

<u>Column 4,</u>
Line 43, after "compact," insert -- and the support --

Signed and Sealed this

Sixteenth Day of December, 2003

JAMES E. ROGAN
*Director of the United States Patent and Trademark Office*